US012719318B2

(12) United States Patent
Masera et al.

(10) Patent No.: US 12,719,318 B2
(45) Date of Patent: Aug. 25, 2026

(54) ELECTRIC MACHINE WITH LAMINATED CORE

(71) Applicant: MAHLE International GmbH, Stuttgart (DE)

(72) Inventors: Sebastjan Masera, Rence (SI); Tomaz Curk, Ajdovscina (SI); Andraz Strnisnik, Trojane (SI); Vid Zavodnik, Lj-Dobrunje (SI); Tin Peressutti, Ljubljana (SI)

(73) Assignee: Mahle International GmbH (DE)

(*) Notice: Subject to any disclaimer, the term of this patent is extended or adjusted under 35 U.S.C. 154(b) by 218 days.

(21) Appl. No.: 18/777,494

(22) Filed: Jul. 18, 2024

(65) Prior Publication Data

US 2025/0030283 A1 Jan. 23, 2025

(30) Foreign Application Priority Data

Jul. 20, 2023 (EP) .................................... 23186697

(51) Int. Cl.
*H02K 1/18* (2006.01)

(52) U.S. Cl.
CPC .................................... *H02K 1/187* (2013.01)

(58) Field of Classification Search
CPC ............ C23C 18/1216; C23C 18/1254; C23C 18/1279; C23C 14/10; C23C 16/401; C30B 23/02; C30B 25/02; C30B 29/18; C30B 5/00; H02K 1/18; H02K 1/187; H02K 7/14; H02K 1/00; H02K 1/02; H02K 1/04; H02K 1/06
See application file for complete search history.

(56) References Cited

U.S. PATENT DOCUMENTS

| | | | | |
|---|---|---|---|---|
| 7,138,471 | B2 | 11/2006 | Clayton | |
| 10,965,175 | B2 | 3/2021 | Guigou | |
| 2007/0278892 | A1* | 12/2007 | Lee | H02K 15/026 310/216.093 |
| 2010/0066193 | A1* | 3/2010 | Noda | H02K 15/095 310/187 |

* cited by examiner

*Primary Examiner* — Naishadh N Desai
(74) *Attorney, Agent, or Firm* — Fishman Stewart PLLC

(57) ABSTRACT

An electric machine may include a rotor rotatable about a motor axial direction, a stator including a laminated core with axially successive laminations, a carrier to which the stator is fixed, and at least two pins disposed spaced apart in a motor circumferential direction. The pins may be fixed to the carrier. The laminated core may include, for a respective pin, an associated guide through which the respective pin passes. The associated guide may have an associated lamination opening in at least a part of the laminations. The respective pin may be in contact with at least some of the laminations in an axial contact section. In the contact section, at least some of the lamination openings may have at least one tooth projecting radially inwardly. A respective tooth may extend circumferentially over a tooth segment such that an adjoining gap segment is free of teeth.

20 Claims, 11 Drawing Sheets

ELECTRIC MACHINE WITH LAMINATED CORE

CROSS-REFERENCE TO RELATED APPLICATION

This application claims priority to European Patent Application No. EP 23186697.1, filed on Jul. 20, 2023, the contents of which is hereby incorporated by reference in its entirety.

TECHNICAL FIELD

The present invention relates to an electric machine, in particular an electric motor for a fan, which has a stator with a laminated core and a carrier to which the stator is fixed.

BACKGROUND

An electric machine has a rotor and a stator which interact electromagnetically with each other during operation. In particular, such an electric machine is designed as an electric motor. The rotor rotates about an axis of rotation. For reliable operation, the rotor and stator must be positioned relative to one another, in particular coaxially. Positioning is usually achieved by fixing the stator to a carrier. For this purpose, the stator is usually positioned accordingly relative to the carrier, attached to the carrier and then fixed to the carrier by means of screw connections.

The stator usually has a laminated core, also referred to a laminated core in the following. The laminated core has successive lamination along the axis of rotation. For example, windings for electromagnetic interaction can be wound around the laminated core. During operation, heat is generated in the stator and in particular in the laminated core, which can impair the operation of the electrical machine.

Such electrical machines are known, for example, from U.S. Pat. Nos. 10,965,175 B2 and 7,138,471 B2.

SUMMARY

The present invention is concerned with the problem of providing improved or at least alternative embodiments for an electrical machine of the aforementioned type.

This problem is solved according to the invention by the subject matter of the independent claim(s). Advantageous embodiments are the subject matter of the dependent claim(s).

Accordingly, the present invention is based on the basic idea of guiding pins fixed to a carrier in an electric machine through respective associated guides of a laminated core, wherein openings in laminations of the laminated core forming the guides have projecting teeth which are in contact with the corresponding associated pin and the lamination, distanced to the teeth, are distanced to the pins and thus free of contact to the pins. The projecting teeth result in reliable thermal and electrical contact between the laminated core and the respective pin, so that heat is reliably transported away from the laminated core and thus from the rotor via the pins, and the rotor is thus reliably cooled. The reliable contact between the laminated core and the pins further results in the laminated core and the pins being electrically equipotential. As a result, there is improved compensation of unwanted electromagnetic interference. Thus, improved operation and electromagnetic compatibility of the electrical machine are achieved. At the same time, the locally contact-free arrangement of the laminations to the respective pin leads to a reduction in the forces required when joining the laminated core to the pins. As a result, on the one hand the risk of damage to the laminated core is at least reduced, and such damage is in particular avoided. Thus, the aforementioned contacts between the respective lamination and the associated pin are reliably established, as are the contact-free sections, so that in turn there is improved thermal dissipation and electromagnetic compensation. On the other hand, the reduction of the required forces leads to a simplified and more precise manufacture of the electrical machine.

According to the idea of the invention, the electric machine has a rotor and the stator. The rotor rotates in operation about an axially extending axis of rotation of the motor, which is also referred to below as the motor axial direction. The stator has the laminated core. The laminated core has axially successive lamination, in particular consists of the axially successive lamination. The stator is fixed to the carrier. The electric machine has at least two pins spaced apart in a motor circumferential direction. The pins are fixed to the carrier and extend axially. The laminated core has an associated guide for the respective pin, through which the pin passes. The respective guide extends in an associated axial direction, which is also referred to below as guide axial direction. The respective guide has an associated opening in at least a part of the lamination, wherein the opening is also referred to below as lamination opening. Thus, the respective pin passes through the lamination openings of the associated guide. The respective pin is in contact with the laminations of the lamination in an axial contact section of the pin. In the contact section, at least a part of the lamination openings, preferably the respective lamination opening, has at least one tooth. The respective tooth projects radially inward with respect to the associated guide axial direction. The respective tooth extends in a guide circumferential direction of the associated guide over a segment, which is also referred to below as a tooth segment, so that, in the associated lamination opening, a gap segment adjoining in the tooth segment in the guide circumferential direction is free of teeth. The respective tooth contacts the associated pin and a clearance segment adjoining the respective tooth in the associated lamination opening in the guide circumferential direction of the associated guide is free of contact with the associated pin and thus distanced to the pin.

Thermal dissipation and electromagnetic compensation are more distinct and improved if the pins are each thermally and electrically connected to the carrier. Conveniently, the carrier is thermally and electrically conductive and grounded.

The contact of the respective tooth with the associated pin means in the present case an at least substantially continuous contact. The contact can therefore be interrupted locally, for example due to radial recesses in a radial outer side in the contact section of the pin.

The motor axial direction and the guide axial directions are parallel to each other. Consequently, in the present case "axial" means along one of the axial directions.

The axial directions are spaced apart. Thus, "radial" refers in each case to the associated axial direction.

The respective circumferential direction is related to the associated axial direction, that is it revolves around the associated axial direction. This means that the motor circumferential direction is related to the motor axial direction and the respective guide circumferential direction is related to the associated guide axial direction.

The respective guide axial direction is conveniently coaxial with the associated pin. This means that the respective guide axial direction is suitably coaxial with an axis of the associated pin, in particular corresponds to the pin axis.

The laminated core serves in particular to guide fields generated during operation of the electrical machine for electromagnetic interaction. For this purpose, at least one winding/coil of the stator can be wound around the laminated core.

Preferably, at least one of the guides, preferably the respective guide, is formed in an associated radially projecting tongue of the laminated core, which is spaced apart from the at least one winding/coil of the stator. That is, the respective lamination opening is formed in a radially projecting tongue, in particular in an associated radially projecting tongue, of the associated lamination.

The pins are conveniently electrically conductive, for example made of a metal or metallic alloy.

The respective pin can be fixed to the carrier in any way.

Preferably, the respective pin is overmolded with the carrier. The respective pin can be inserted as an insert in an injection mold and then the carrier can be produced by injection molding in such a way that the pins are fixed to the carrier and project axially from the carrier.

For example, the carrier may be made of a metal or metallic alloy, such as aluminium, in particular by injection molding.

The carrier can preferably have ribs which project axially, for example. This improves thermal dissipation of the electric machine and in particular of the stator.

The rotor is beared so that it can rotate about the motor axial direction. The bearing can be mounted on the carrier, that is the rotor can be rotatably mounted on the carrier. For this purpose, an axially extending bolt can be fixed to the carrier and the rotor can be rotatably mounted on the bolt.

The electric machine is advantageously designed as an electric motor.

The electric machine, in particular the electric motor, can be used in any application.

In particular, the electric machine may be part of a fan, with the rotor being connected to fan blades of the fan.

In preferred embodiments, axially successive teeth and gap segments are arranged offset from one another in the guide circumferential direction of the associated guide, so that in an axial plan view of the guide, the teeth of the laminations of the respective guide form a shoulder of the guide that is closed in the guide circumferential direction and projects radially inwards. The shoulder is thus closed in the top view in the guide circumferential direction of the associated guide. That is, the shoulder does not consist of tooth segments connected to each other in the circumferential direction. Such an arrangement of the teeth, and thus the shoulder, has the effect that the respective pin is connected to the laminated core correspondingly in the guide circumferential direction of the associated guide in each angular section. Thus, there is an improved thermal and electrical connection of the laminated core to the respective pin and consequently improved thermal dissipation and electromagnetic compensation.

Preferably, the respective tooth is formed, in particular bent, when the pin is guided through the associated lamination opening. The teeth and the pins are thus dimensioned accordingly. Thus, the respective tooth is preloaded against the associated pin. On the one hand, this results in reliable contact between the respective tooth and the associated pin, so that thermal dissipation and electromagnetic compensation are implemented more reliably. At the same time, the clearance segments adjacent to the teeth lead to and allow an advantageous deformation of the teeth, so that the contact is improved and precise. On the one hand, reliable relative positioning of the laminated core and thus of the rotor to the pins and consequently in the electrical machine is thus possible.

In preferred embodiments, the laminated core is pressed axially onto the pins so that the respective tooth is bent and a press fit is produced between the pins and the laminated core. Thus, the teeth not only result is reliable thermal and electrical contact of the laminated core, but also the laminated core is fixed to the carrier and consequently in the electrical machine. The pins therefore also serve for positioning and can consequently also be referred to as positioning pins.

Particularly preferred are embodiments in which the stator as a whole is positioned and fixed to the carrier by means of the press fit. Preferably, positioning and fixing are achieved exclusively by means of the press fit. Thus, the positioning and fixing of the stator in the electrical machine is free of screw connections. This leads to a considerable simplification of the manufacture of the electrical machine with a significant decrease in the cycle time in production without additional tooling, devices or dedicated positioning features.

Possible variants are those in which the contact section of at least one of the pins, preferably of the respective pin, has at least one projection which projects radially outwards from the pin with respect to the associated guide axial direction and extends axially. The respective projection is in contact in the contact section with at least two laminations of the associated guide. Thus, the contact between the respective pin and the laminated core is increased. The respective projection conveniently leads to a deformation of the associated laminations. As a result, increased and more reliable contact occurs, so that thermal dissipation and electromagnetic compensation are in turn improved.

By definition, the contact between the lamination and the respective projection takes place outside the clearance segments. This means that the respective projection either contacts the respective associated lamination in a tooth segment or interrupts a clearance segment.

The respective projection extends locally in the guide circumferential direction of the associated guide.

Preferably, at least one of the projections, preferably the respective projection, is formed as a radially projecting tip. This results in the respective lamination in contact with the tip being deformed by the tip in such a way that the tip holds and thus secures the lamination axially and about the associated guide circumferential direction. This leads to an increased and improved contact between the laminated core and the pin as well as to an improved and more stable positioning of the laminated core, in particular the stator, on the carrier.

At least one of the projections, in particular the respective projection, can be introduced into the contact section of the associated pin in a spanning manner, for example by means of scoring. This creates a radial recess in the contact section, which results in the projection, in particular the tip. The recess is conveniently spaced from the laminations and thus free of contact to the laminations.

It is possible that at least one of the pins, preferably the respective pin, has at least two such projections, which are spaced apart from one another in the associated guide circumferential direction. Here, at least one projection of the at least one pin can be in contact with a tooth and at least one projection in contact with the lamination outside the tooth segment of at least one of the laminations.

If at least one of the pins has at least one such projection, the associated laminations may each have a single such tooth in the lamination opening.

It is possible that the contact section of at least one of the pins, preferably of the respective pin, is smooth so that only the teeth are in contact with the pin in the contact section. In this variant, the respective gap segment is thus a clearance segment.

If at least one of the pins is smooth as explained, the associated laminations preferably have at least two teeth spaced apart from each other in the associated guide circumferential direction in the associated lamination openings.

The electric machine has a number N of such pins, where N is greater than or equal to two.

Preferably, the electric machine has three such pins, which are preferably arranged equidistantly to each other in the motor circumferential direction. Thus, with a simplified design and thus manufacture of the electric machine, there is a sufficiently high contact between the laminated core and the pins and consequently a sufficiently high cooling and electromagnetic compensation. In addition, the laminated core, preferably the stator, can be reliably and precisely positioned and fixed in this way relative to the carrier and thus in the electrical machine.

If the lamination openings each have a single such tooth, the respective tooth segment is preferably 360°/N, that is the respective tooth extends over 360°/N in the associated guide circumferential direction. In addition, an offset of the teeth of the lamination openings of lamination openings of the respective lamination that follow one another in the motor circumferential direction, hereinafter also referred to as opening offset, is advantageously 360°/N with respect to the associated guide circumferential direction. In addition, an offset of the teeth of axially successive lamination openings of the respective guide, hereinafter also referred to as lamination offset, is 360°/N. The said extensions and offsets are conveniently such that the above-described shoulder is formed in the respective guide. For example, if the electric machine has three pins, that is N=3, the respective tooth segment is 120°, that is the respective tooth extends 120° in the associated guide circumferential direction. In addition, the teeth of lamination openings of successive lamination openings of the respective lamination in the motor circumferential direction are 120° offset from each other. In addition, teeth of axially successive lamination openings of the respective guide are offset by 120° from each other.

Preferably, the opening offset and lamination offset are opposite to each other.

The respective lamination opening can have at least two teeth between which a gap segment is arranged in each case. The number M of teeth of the respective lamination opening is therefore greater than or equal to two, M≥2. Preferably, the teeth of the respective lamination opening are spaced apart from each other in the associated guide circumferential direction with a tooth offset of 360°/M. Advantageously, teeth of the lamination openings of successive lamination openings of the respective lamination in the motor circumferential direction are offset from each other with an opening offset with respect to the associated guide circumferential direction, which opening offset is 360°/2M. Preferably, moreover, teeth of axially successive lamination openings of the respective guide are offset with respect to each other with a lamination offset of 360°/N. The said projections are conveniently such that the above-described shoulder is formed in the respective guide.

The number M of teeth of the respective lamination opening can be six, that is M=6. With three pins, that is N=3, this leads to an advantageous variant in which the teeth of the respective lamination opening are spaced apart from one another in the associated guide circumferential direction with a tooth offset of 60°. In addition, teeth of successive lamination openings of the respective lamination in the motor circumferential direction are offset from each other with an opening offset of 30° with respect to the associated guide circumferential direction. Also, teeth of axially successive lamination openings of the respective guide are offset from each other with a lamination offset of 120°.

It is possible to form and manufacture at least two laminations with teeth, each as an individually designed component.

In preferred embodiments, at least two of the lamination of the laminated core having teeth, preferably all lamination of the laminated core having teeth, are designed as identical parts. In this case, the axially successive laminations are rotated relative to each other about the motor axial direction and thus offset in the motor circumferential direction. This offset is also referred to below as row offset.

The row offset is preferably 360°/N. With three pins, that is N=3, axially successive laminations are thus each offset by 120° relative to one another, so that every third lamination has lamination openings with identically oriented teeth.

It is understood that the laminated core can also have laminations which do not have a lamination opening and/or which have lamination openings but do not comprise such a tooth. In particular, it is possible to arrange at least one such lamination at an axial end face of the laminated core. It is likewise possible to arrange at least one such lamination between such laminations with teeth.

Further important features and advantages of the invention are apparent from the dependent claims, from the drawings, and from the accompanying figure description based on the drawings.

It is understood that the above features and those to be explained below can be used not only in the combination indicated in each case, but also in other combinations or on their own, without departing from the scope of the present invention.

Preferred exemplary embodiments of the invention are shown in the drawings and will be explained in more detail in the following description, wherein identical reference signs refer to identical or similar or functionally identical components.

BRIEF DESCRIPTION OF THE DRAWINGS

It shows, each schematically

DETAILED DESCRIPTION

Figure 1:
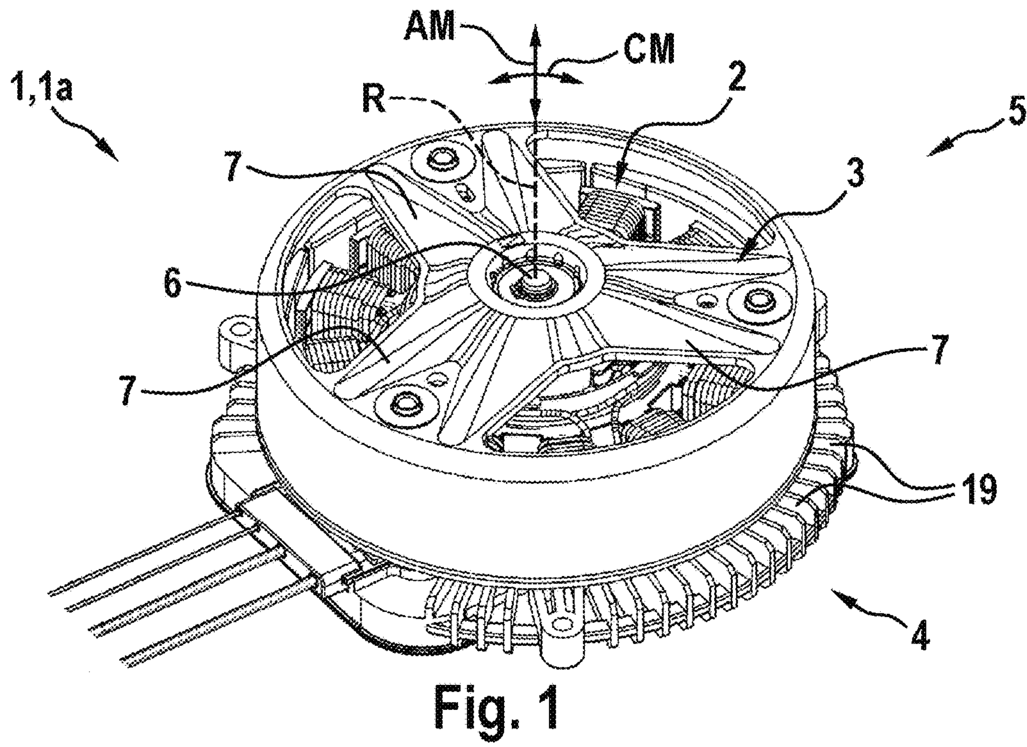
FIG. 1 shows a spatial view of an electrical machine.
Figure 2:
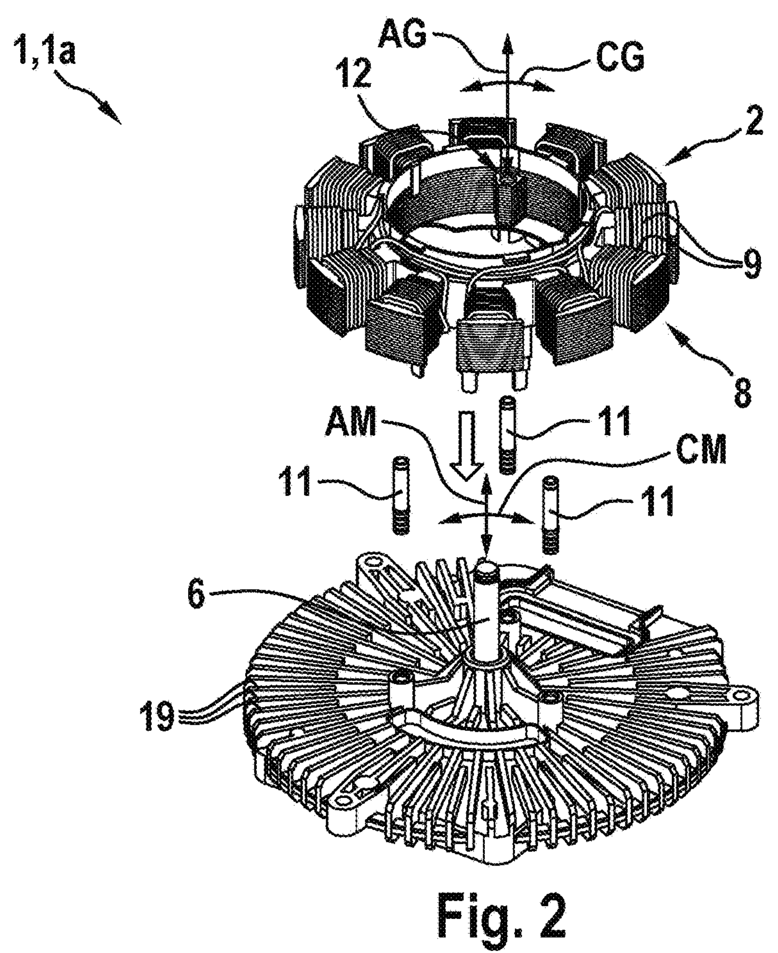
FIG. 2 shows a spatial exploded view of a carrier, pins and a stator with a laminated core of the electric machine.

An electric machine 1 as shown in FIG. 1 has a stator 2 and a rotor 3. The electric machine 1 also has a carrier 4 to which the stator 2 is fixed and positioned. FIG. 2 shows an exploded view in which the carrier 4 and the stator 2 can be seen. During operation of the electric machine 1, the rotor 3 rotates relative to the stator 2 about an axial direction AM of the electric machine 1, which is also referred to below as the motor axial direction AM. Thus, an axis of rotation R of the rotor 3 is coaxial with the motor axial direction AM. In the exemplary embodiments shown, the stator 2 is arranged radially outside the rotor 3 with respect to the motor axial direction AM and surrounds the rotor 3 in a circumferential direction CM of the electric machine 1, which is also referred to hereinafter as the motor circumferential direction CM. In the exemplary embodiments shown, the rotor 3 is mounted on the carrier 4 via a bolt 6. The bolt 6 extends coaxially to the motor axial direction AM and is fixed to the carrier 4.

In the exemplary embodiments shown, the electric machine 1 is designed as an electric motor 1*a*, the electric motor 1*a* being used for a fan 5. For this purpose, fan blades 7 of the fan 5 are connected to the rotor 3 in a rotationally fixed manner.

Figure 3:
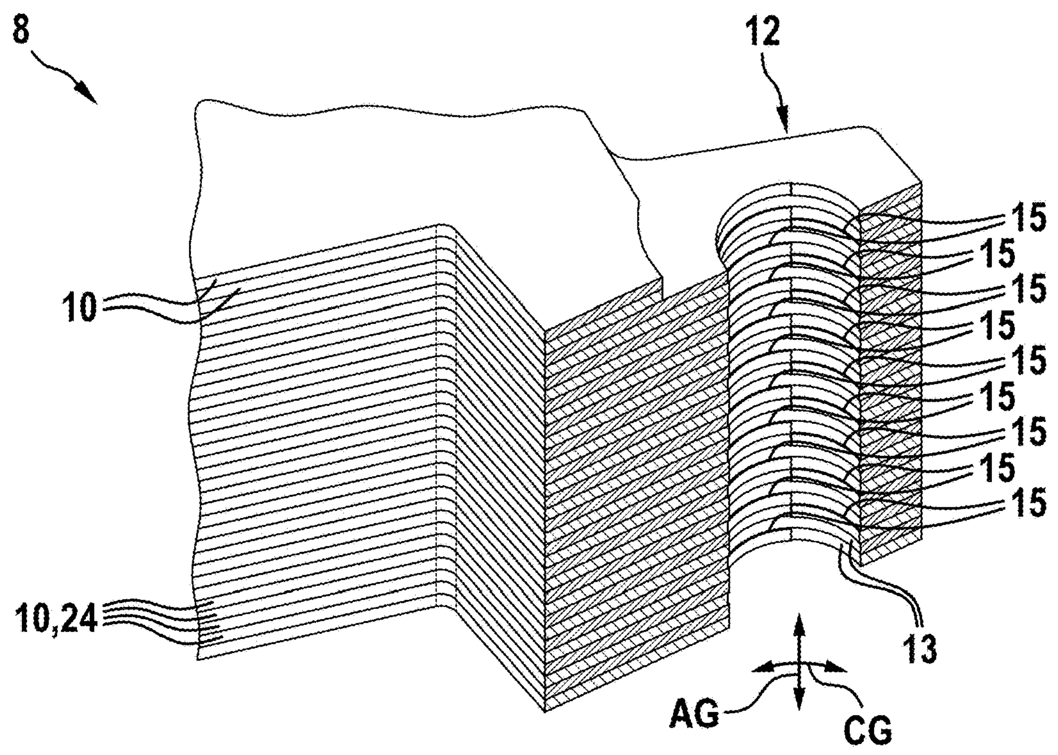
FIG. 3 shows a sectional view through the laminated core in the area of a guide.
Figure 12:
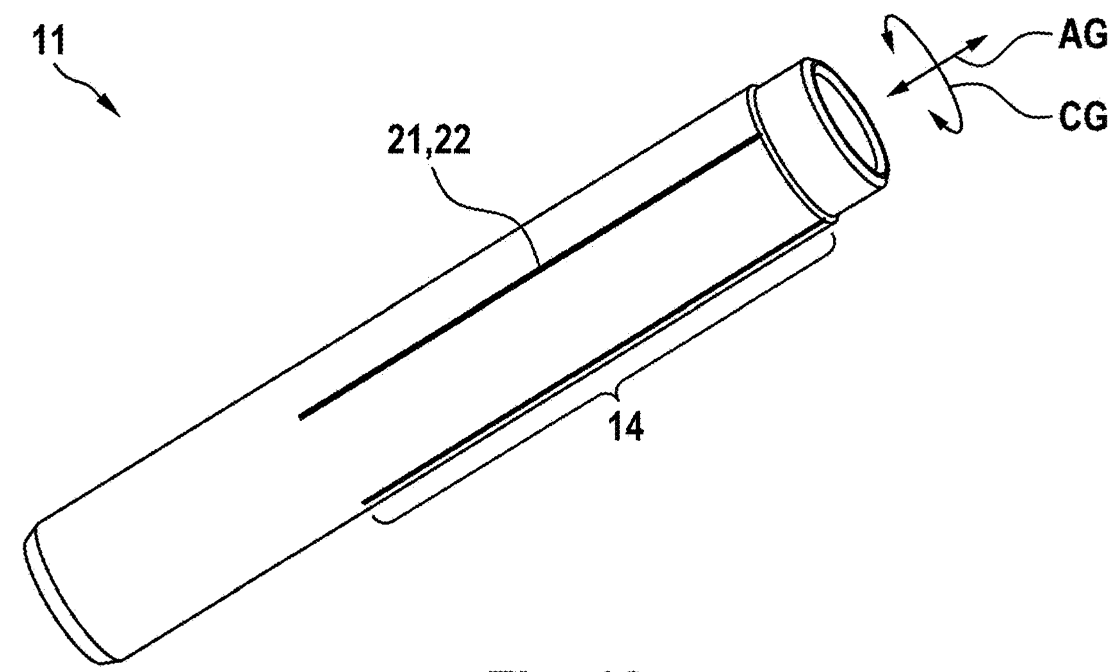
FIG. 12 shows a spatial view of the pin.
Figure 21:
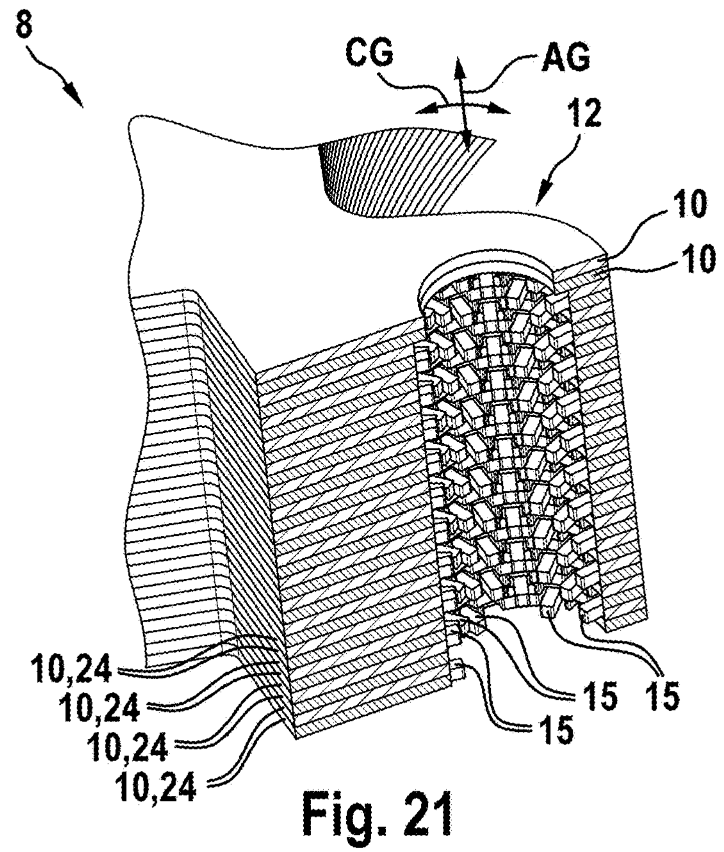
FIG. 21 shows a sectional view of the lamination core in the area of a guide.
Figure 22:
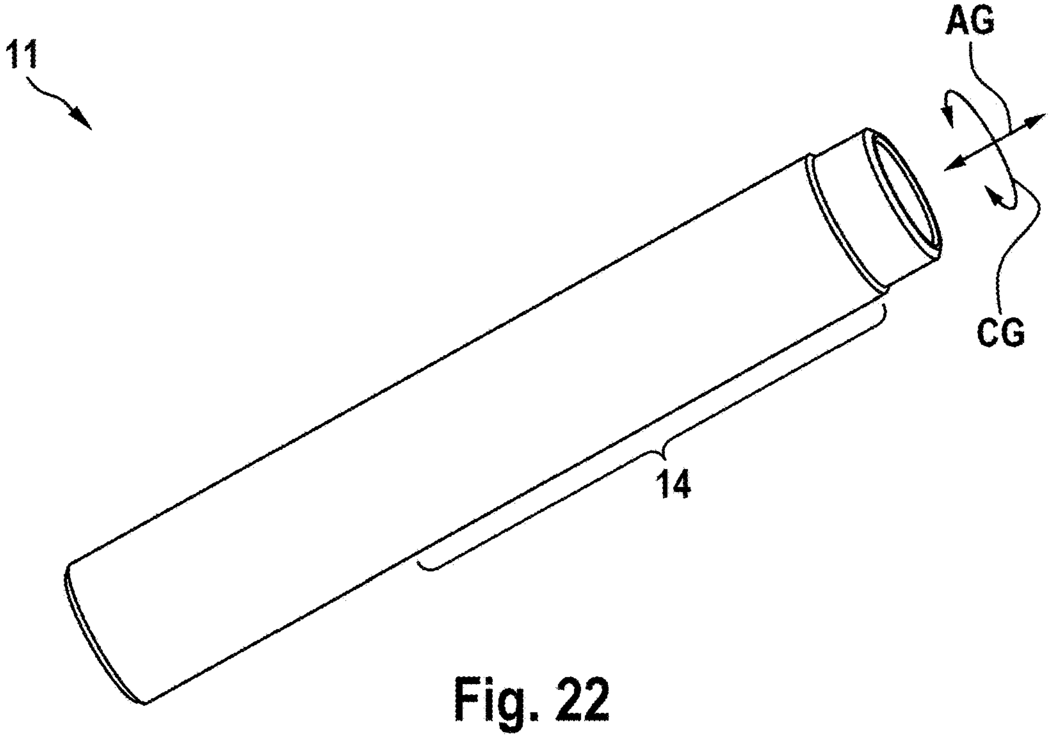
FIG. 22 shows a spatial view of a pin in another exemplary embodiment.
Figure 23:
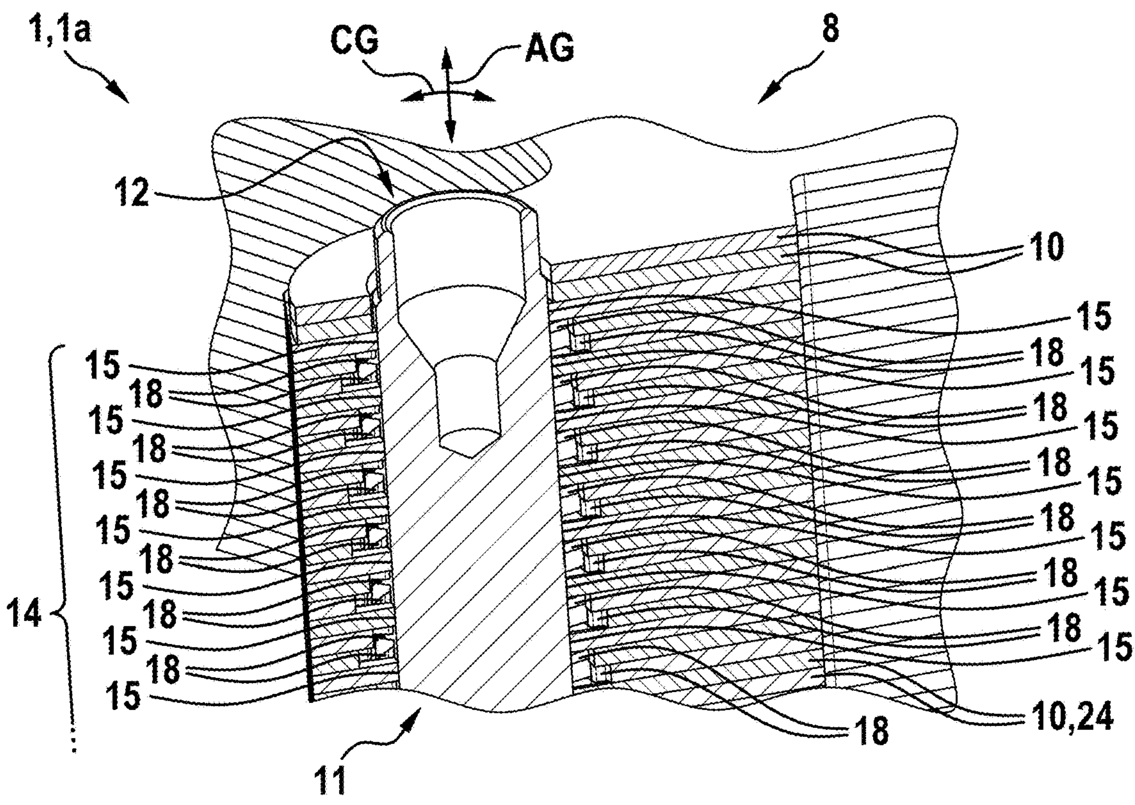
FIG. 23 shows a sectional view through the electric machine in the area of a guide of the laminated core.

The stator 2 has, as can be seen for example in FIGS. 2, 3 and 21, a laminated core 8 around which at least one winding 9 of the stator 2, visible only in FIG. 2, is wound. The laminated core 8 has laminations 10 following one another along the motor axial direction AM and thus axially. The laminations 10 are electrically conductive at least in their core, for example made of silicon steel. As can be seen, for example, from FIG. 2, the electric machine 1 also has at least two pins 11 spaced equidistantly from one another in the motor circumferential direction CM. FIGS. 12 and 22 show one such pin 11. In the exemplary embodiments shown, the electric machine 1 has three such pins 11, so that a number N of the pins 11 is three, N=3. The pins 11 are each spaced equidistantly with respect to the motor axial direction AM radially to the motor axial direction AM, that is arranged along a fictitious circle around the motor axial direction AM, which is not shown. The respective pin 11 is fixed to the carrier 4. In the exemplary embodiments shown, the respective pin 11 is overmolded by the carrier 4. That is, the respective pin 11 is inserted in an injection mold and is overmolded with the material of the carrier 4. The bolt 6 may be fixed to the carrier 4 in the same manner. In the exemplary embodiments and preferably, carrier 4 and pins 11 are each manufactured at least in their core of an electrically conductive material. For example, the carrier 4 can be made of aluminium alloy and the pins 11 of steel. The respective pin 11 extends axially and thereby projects from the carrier 4. For the respective pin 11, the laminated core 8 has an associated guide 12 through which the pin 11 passes, as can be seen, for example, from a synopsis of FIGS. 2 to 4. In the exemplary embodiments shown, the laminated core 8 thus has three such guides 12. The respective guide 12 extends along an associated axial direction AG, which is also referred to hereinafter as guide axial direction AG. The respective guide axial direction AG thus runs parallel to the motor axial direction AM, so that all axial directions AM, AG run parallel to one another. The guide axial directions AG are radially spaced in accordance with the arrangement of the pins 11 with respect to the motor axial direction AM and are arranged equidistantly with respect to one another along the motor circumferential direction CM. The respective guide 12 has an associated opening 13 in at least a part of the laminations 10, in the shown exemplary embodiment in the respective lamination 10, which will also be referred to hereinafter as lamination opening 13. Thus, the respective pin 11 passes through the lamination openings 13 of the associated guide 12.

Figure 4:
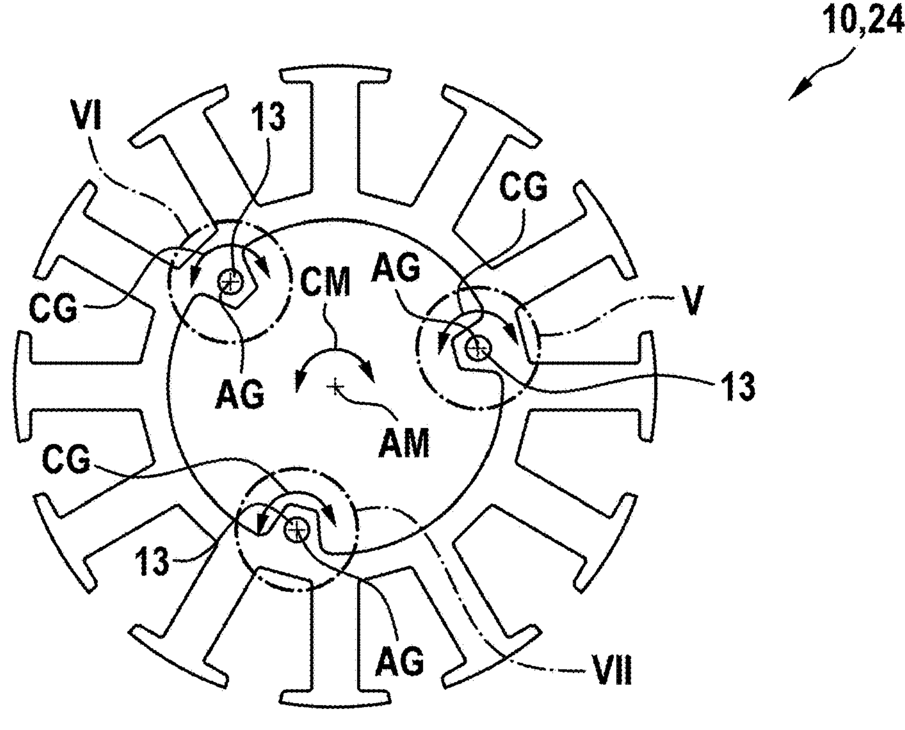
FIG. 4 shows a top view of a lamination of the laminated core.
Figure 13:
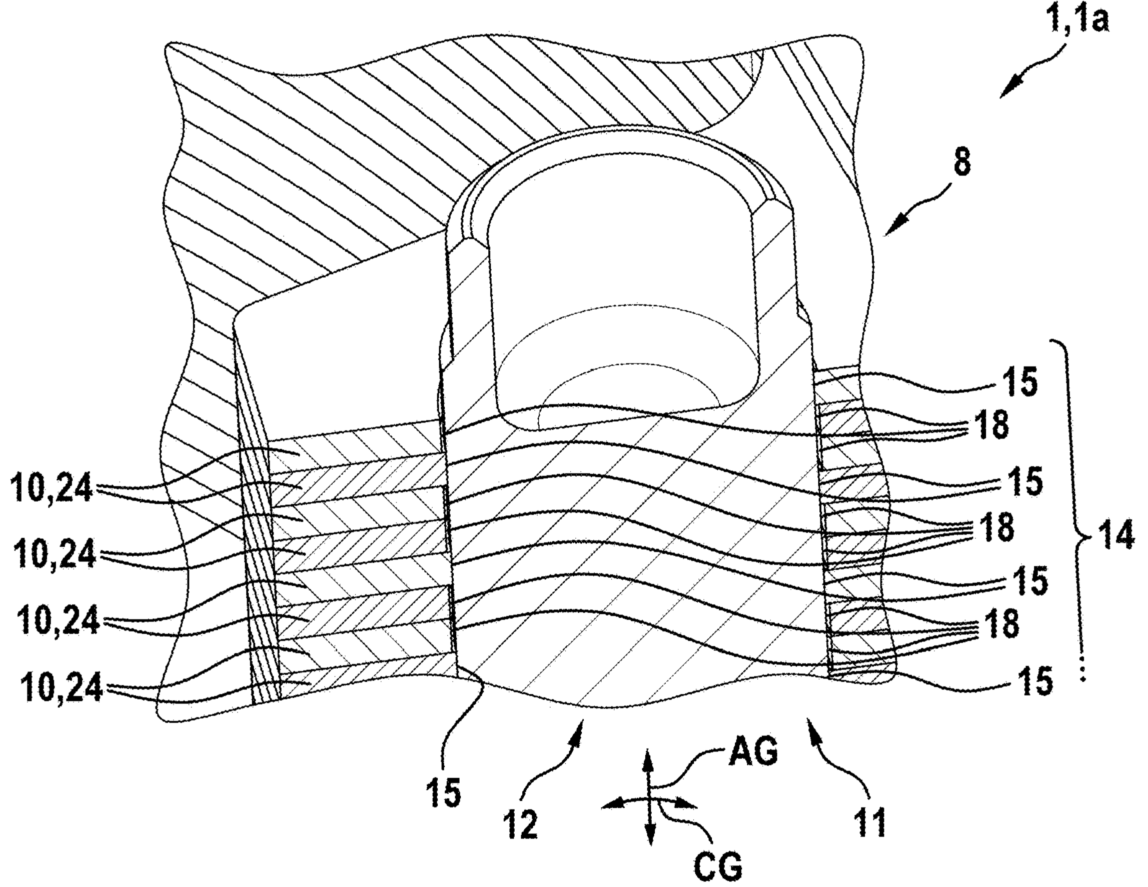
FIG. 13 shows a sectional view of the electric machine in the area of a guide.
Figure 14:
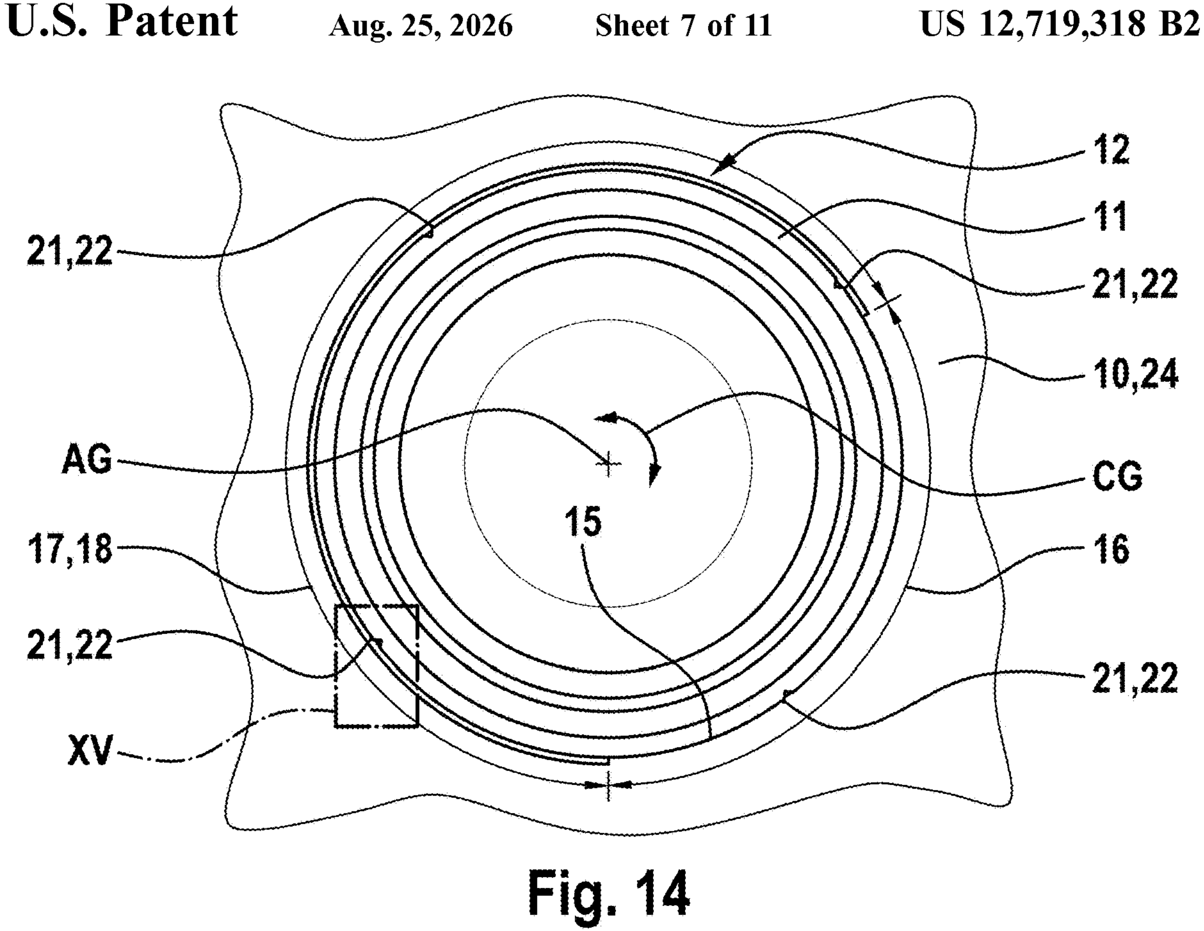
FIG. 14 shows a top view of the electric machine in the area of the guide.
Figure 16:
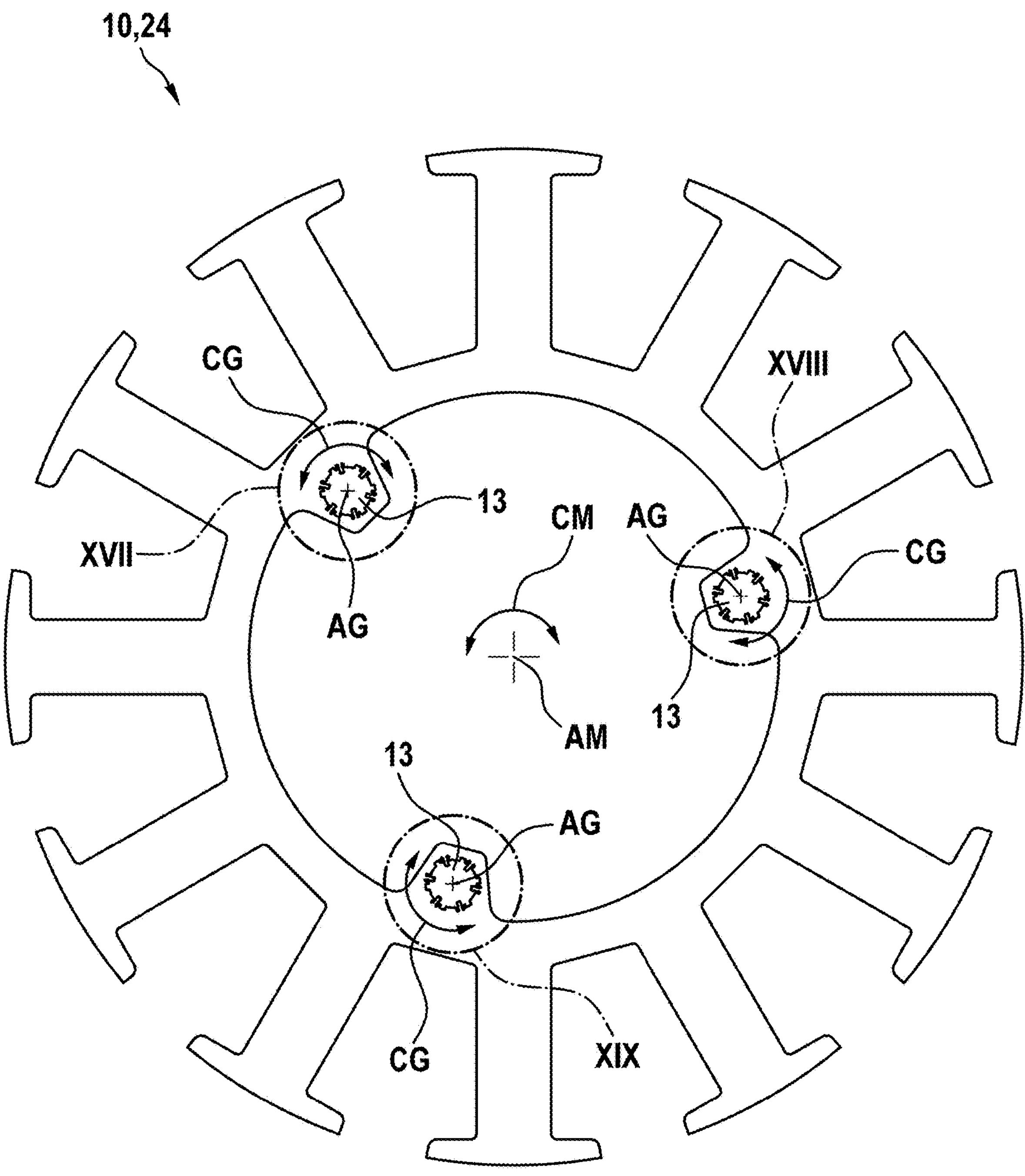
FIG. 16 shows a top view of the lamination of the lamination core in a further exemplary embodiment.

As will be explained below, the respective pin 11 is in contact with laminations 10 of the laminated core 8 within an axially extending contact section 14 of the pin 11 (see also FIGS. 12 and 22). In the contact section 14, at least some of the lamination openings 13 each have at least one tooth 15 projecting radially inward with respect to the associated guide axial direction AG. In the exemplary embodiments shown, in the contact section 14 the respective lamination opening 13 has at least one tooth 15 projecting radially inwards with respect to the associated guide axial direction AG. FIGS. 4 and 16 each show a top view of a lamination 10 with lamination openings 13, which each have at least one such tooth 15. As shown in FIGS. 4 and 16, the respective tooth 15 extends in a circumferential direction CD of the associated guide 12, hereinafter also referred to as guide circumferential direction CG, over a tooth segment 16. Thus, a gap segment 17 adjoining in guide circumferential direction CG in the associated lamination opening 13 is free of teeth 15. As can be seen, for example, from FIGS. 13, 14 as well as 23, the respective tooth 15 contacts the associated pin 11. In addition, the lamination opening 13 is spaced apart from the associated pin 11 in a clearance segment 18 following the respective tooth 15 of the associated lamination opening 13 in the guide circumferential direction CG of the associated guide 12 and is thus free of contact to the pin 11.

As indicated by an arrow in FIG. 2, in the exemplary embodiments shown, the laminated core 8 is pressed onto the pins 11 so that a press fit is produced between the laminated core 8 and the pins 11. Due to the described clearance segments 18, the force required for the press fit is reduced, so that the manufacture of the electric machine 1 can be simplified and precise and with decreased cycle time. At the same time, the clearance segments 18 allow a defined deforming of the teeth 15, so that there is a reliable electrical and thermal contact between the laminated core 8 and the pins 11. Consequently, heat can be transferred from the laminated core 8 to the pins 11 and via the pins 11 to the carrier 4 in a reliable and improved manner. Thus, improved thermal dissipation of the laminated core 8 and consequently of the stator 2 is achieved. In the exemplary embodiments shown, the carrier 4 further has axially projecting cooling ribs 19 for improved cooling, as can be seen from FIG. 2. The carrier 4 is grounded by means of an electrical connection, as indicated in FIG. 1. Thus the pins 11 are also grounded. The reliable electrical contact of the teeth 15 with the pins 11 provides a more reliable grounding of the laminated core 8. Thus, undesired electromagnetic interference in the laminated core 8 can be reduced/compensated in a simplified manner. As a result, the operation and the electromagnetic compensation and compatibility of the electrical machine 1 are improved.

In the exemplary embodiments shown, the laminated core 8 is also fixed to the carrier 4 and positioned in the electrical machine 1 by means of the press fit. The positioning and fixing of the laminated core 8 and thus of the stator 2 is therefore free of screw connections. This allows additional simplification of the manufacture of the electrical machine 1 and a further increase in the cycle time during manufacture.

Figure 5:
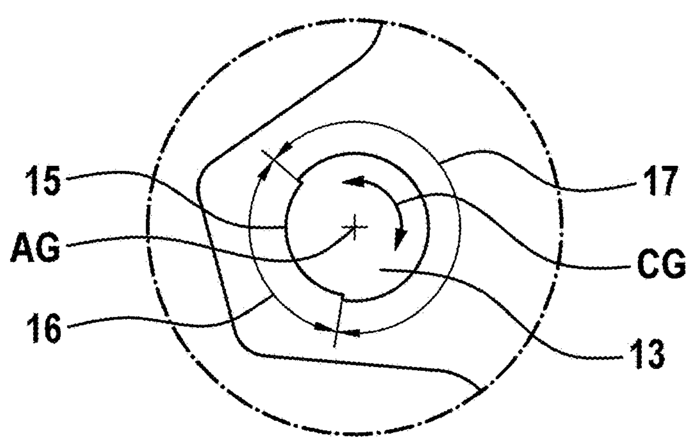
FIG. 5 shows an enlarged view of the area labeled V in FIG. 4.
Figure 6:
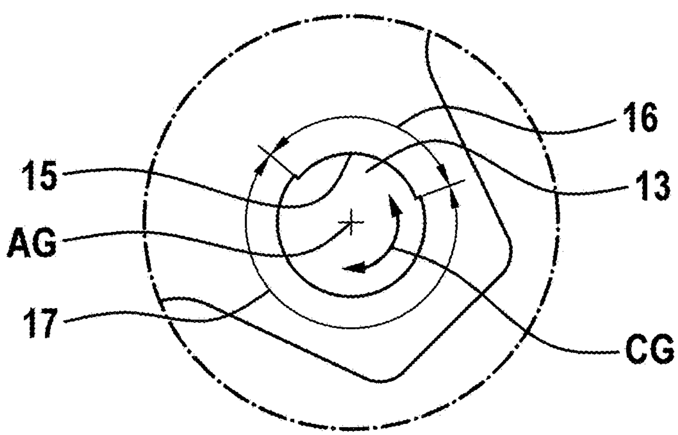
FIG. 6 shows an enlarged view of the area labeled VI in FIG. 4.
Figure 7:
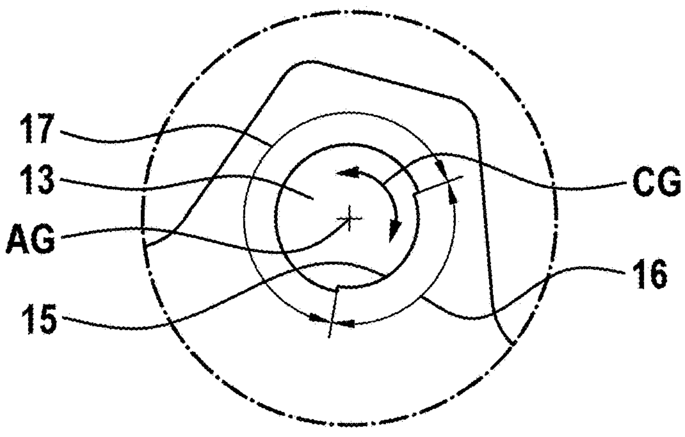
FIG. 7 shows an enlarged view of the area labeled VIII in FIG. 4.
Figure 8:
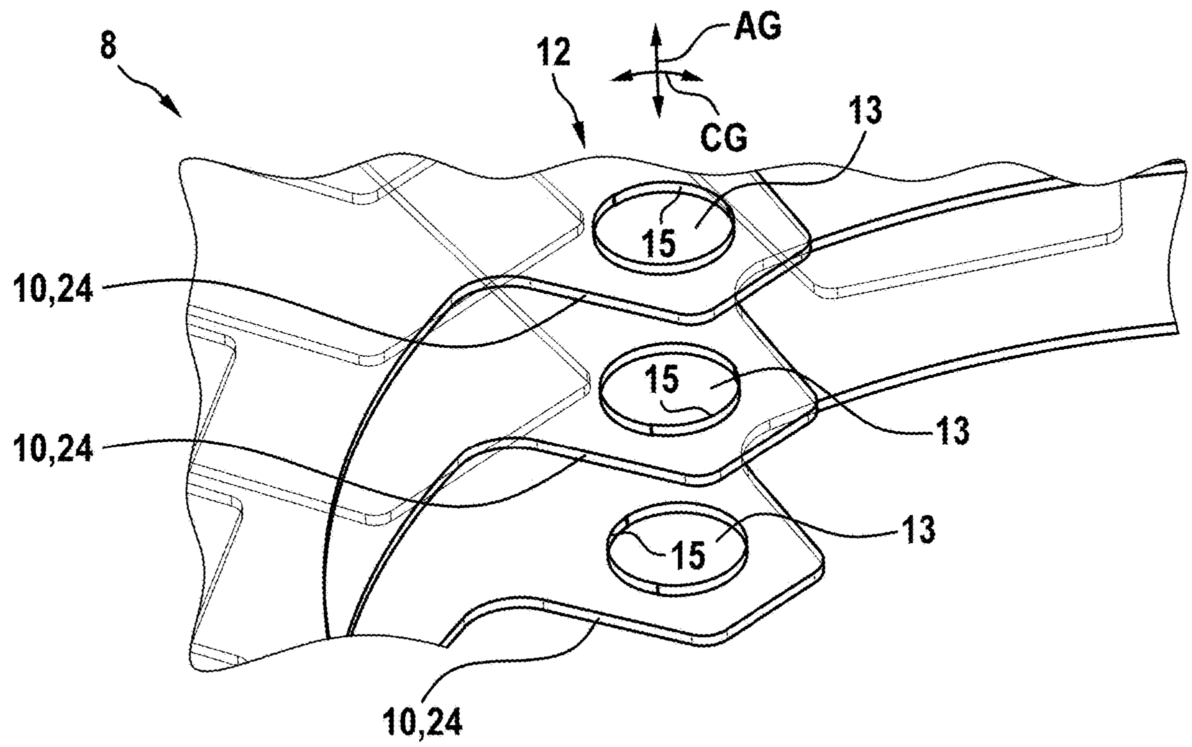
FIG. 8 shows a spatial exploded view of a part of the laminated core in the area of a guide.
Figure 9:
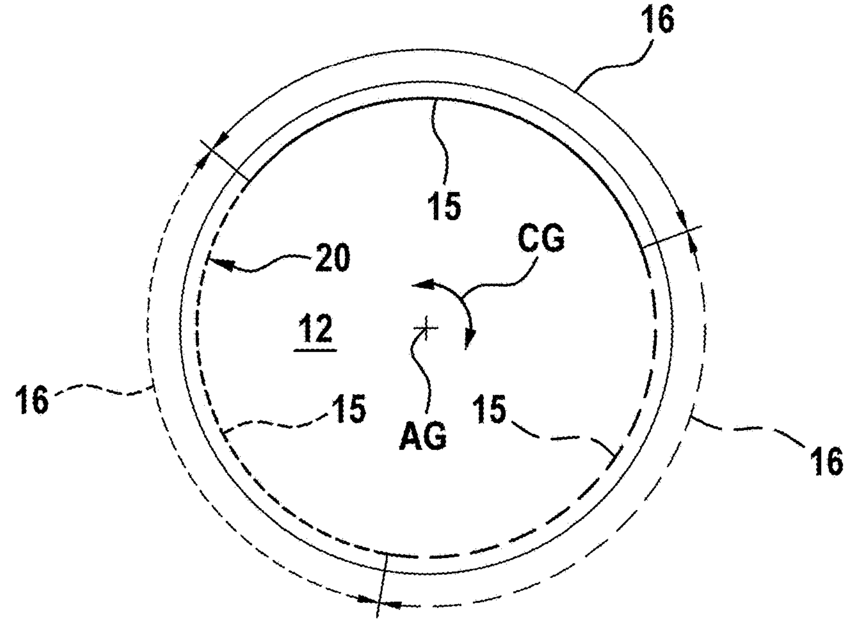
FIG. 9 shows a top view of the guide.

In the exemplary embodiments shown in FIGS. 3 to 15, the respective lamination opening 13 has a single tooth 15, as can be seen from a synopsis of FIGS. 4 to 7. FIGS. 5 to 7 each show enlarged views of one of the lamination openings 13 of the lamination 10 shown in FIG. 4. In these exemplary embodiment, the respective tooth 15 extends over 120° in the associated guide circumferential direction CG, so the tooth segment 16 is 120°. In other words, the tooth segment is 360°/N, where the number N of pins 3 and thus guides 12 is three, as explained above. As can further be seen from FIGS. 4 to 7, the teeth 15 of successive lamination openings 13 of the respective lamination 10 are offset with respect to each other with an offset with respect to the associated guide circumferential direction CG, which offset is hereinafter also referred to as the opening offset. The opening offset is 120°, that is 360°/N. FIG. 8 shows axially successive lamination openings 13 of a guide 12. As can be seen from FIG. 8, in the exemplary embodiments shown in FIGS. 3 to 15, the teeth 15 of axially successive lamination openings 13 of the respective guide 12 are offset from one another with respect to the associated guide circumferential direction CG, which offset is also referred to below as lamination offset. The lamination offset is 360°/N, that is 120°. As can be seen from a synopsis of FIGS. 4 to 8, the opening offset and the lamination offset are in opposite to each other. As indicated in FIG. 9, an axial top view of the respective guide 12 thus results in a shoulder 20, which projects radially inwards with respect to the associated guide axial direction AG and is closed in the associated guide circumferential direction CG. The teeth 15 of the lamination openings 13 of the respective guide 12 are thus offset relative to one another in such a way that such a shoulder 20 is formed. In FIG. 9, one of the teeth 15 is shown with a solid line and the other teeth 15 are shown with different dashed lines to make it clear that the shoulder 20 is composed of teeth 15 that are axially offset from one another.

Figure 17:
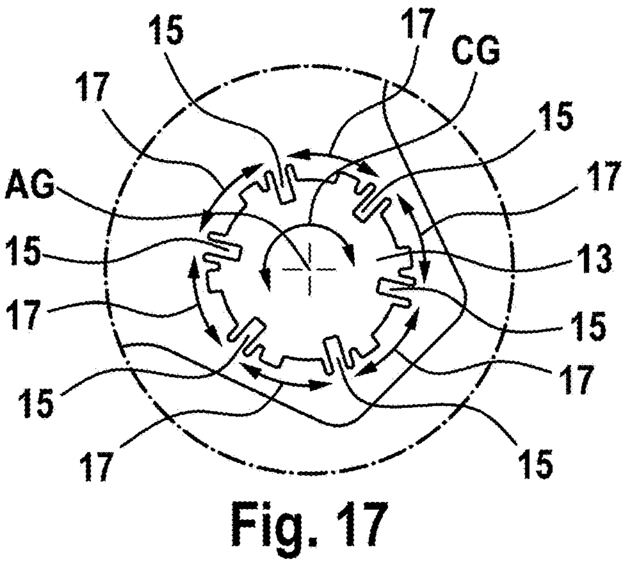
FIG. 17 shows an enlarged view of the area labeled XVII in FIG. 16.
Figure 18:
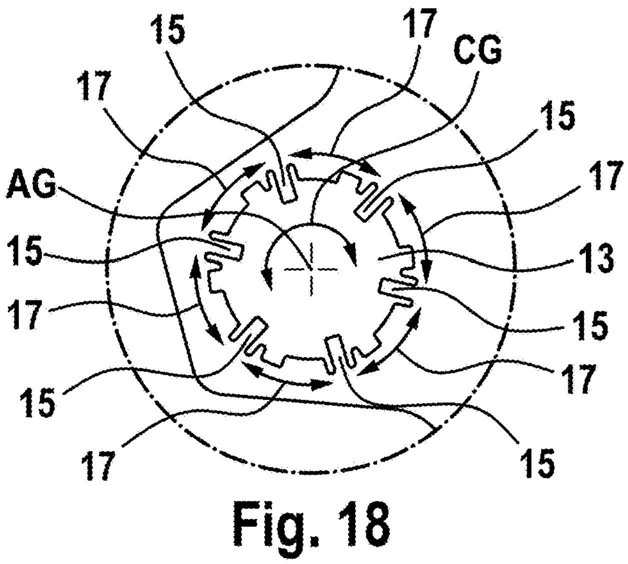
FIG. 18 shows an enlarged view of the area labeled XVIII in FIG. 16.
Figure 19:
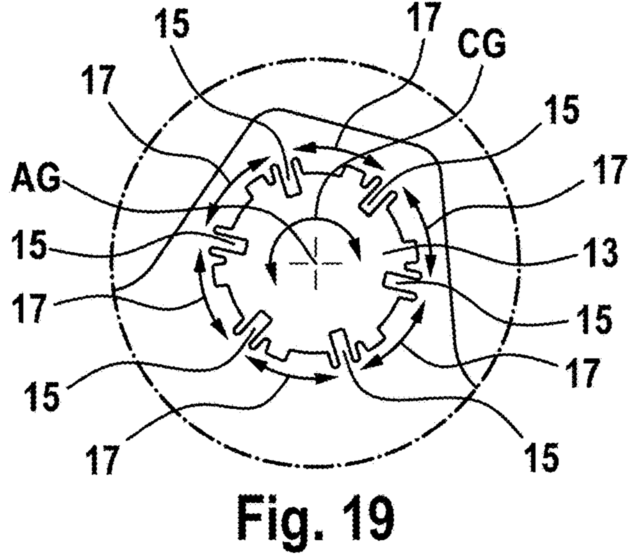
FIG. 19 shows an enlarged view of the area labeled XIX in FIG. 16.
Figure 20:
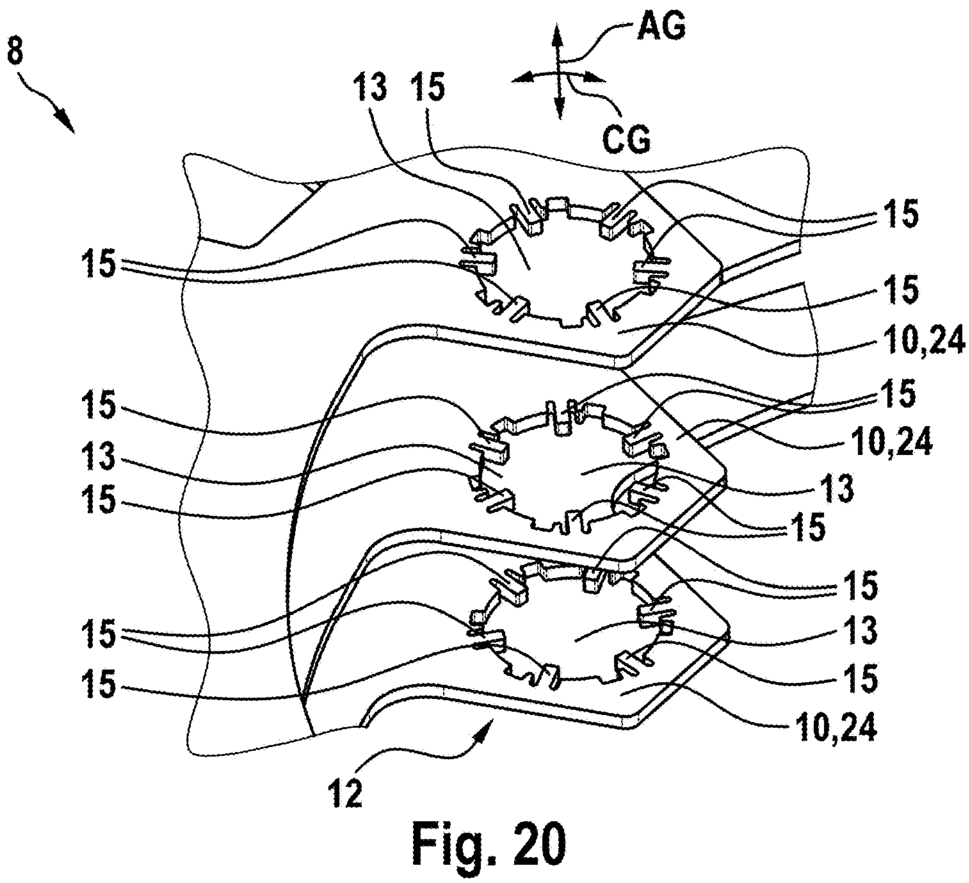
FIG. 20 shows a spatial exploded view of a part of the laminated core with the lamination of FIG. 16 in the area of a guide.

In the exemplary embodiment of FIGS. 16 to 23, the respective lamination opening 13 has at least two teeth 15. The number M of teeth 15 of the respective lamination opening 13 is therefore at least two, M≥2. In the exemplary embodiment shown, the respective lamination opening 13 has six teeth 15, that is M=6. The teeth 15 of the respective lamination opening 13 are arranged equidistantly to one another in the associated guide circumferential direction CG. In the exemplary embodiment shown, therefore, pairs of teeth 15 are arranged radially opposite each other in the respective lamination opening 13 with respect to the associated guide axial direction AG. The teeth 15 of the respective lamination opening 13 are also spaced apart from one another by gap segments 17 in the associated guide circumferential direction CG. FIGS. 17 to 19 each show an enlarged view of one of the lamination openings 13 of the lamination 10 shown in FIG. 16. As can be seen from a synopsis of FIGS. 16 to 19, in the exemplary embodiment shown in FIGS. 16 to 23, the teeth 15 of the respective lamination opening 13 are spaced apart from one another in the associated guide circumferential direction CG with an offset, which is also referred to hereinafter as tooth offset. The tooth offset thus corresponds to the extension of the respective gap segment 17 in the associated guide circumferential direction CG. In the exemplary embodiment shown, the tooth offset is 60°, that is 360°/M. Furthermore, the opening offset, that is the offset of the teeth 14 of successive lamination openings 13 of the respective lamination 10 in the motor circumferential direction AM, is 20°, that is 360°/2M, with respect to the associated guide circumferential direction CG. FIG. 20 shows axially successive lamination openings 13 of one of the guides 12. As can be seen in particular from FIG. 20, the teeth 15 of axially successive lamination openings 13 of the respective guide 12 are offset with respect to each other by a lamination offset of 120°, that is 360°/N. Thus, in axial not shown plan view, a not shown shoulder 20 of the type described above may result for the respective guide 12.

In the exemplary embodiments shown, the laminations 10 of the laminated core 8 having teeth 15 are formed as identical parts 24. In this case, axially successive laminations 10 are arranged rotated relative to one another about the motor axial direction AM, that is with an offset in the motor circumferential direction CM. This offset, which is also referred to below as row offset, is 120°. The row offset is therefore 360°/N.

Figure 10:
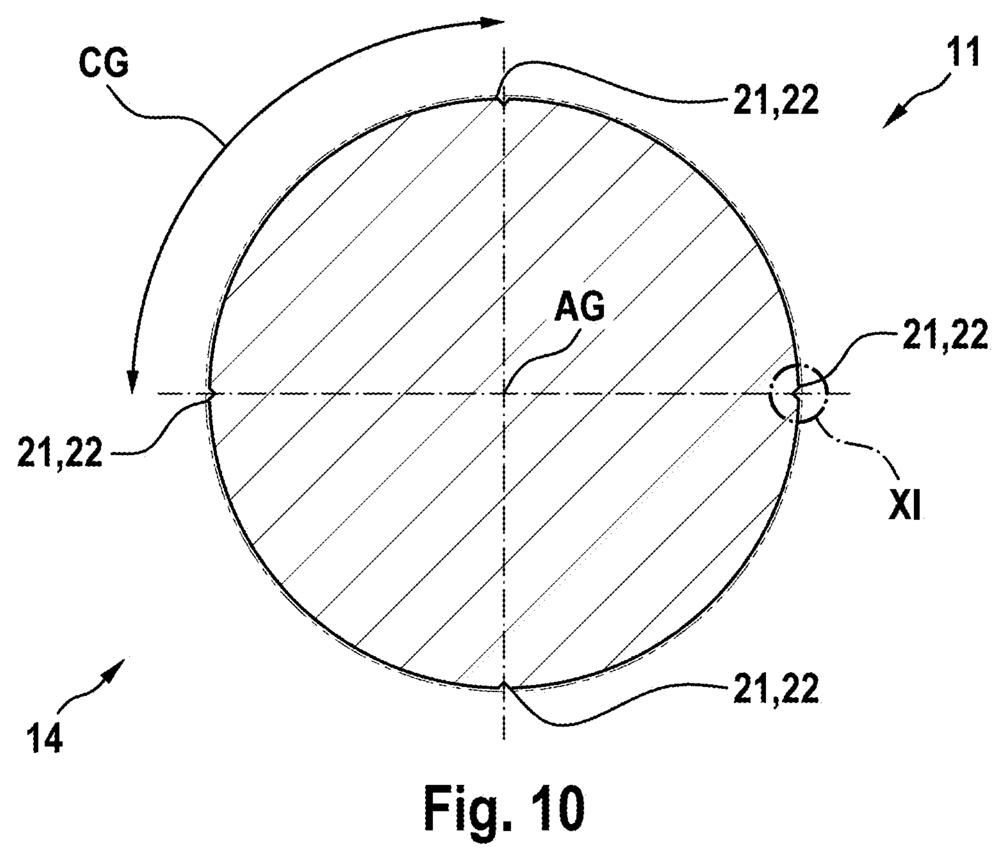
FIG. 10 shows a section through a pin.
Figure 11:
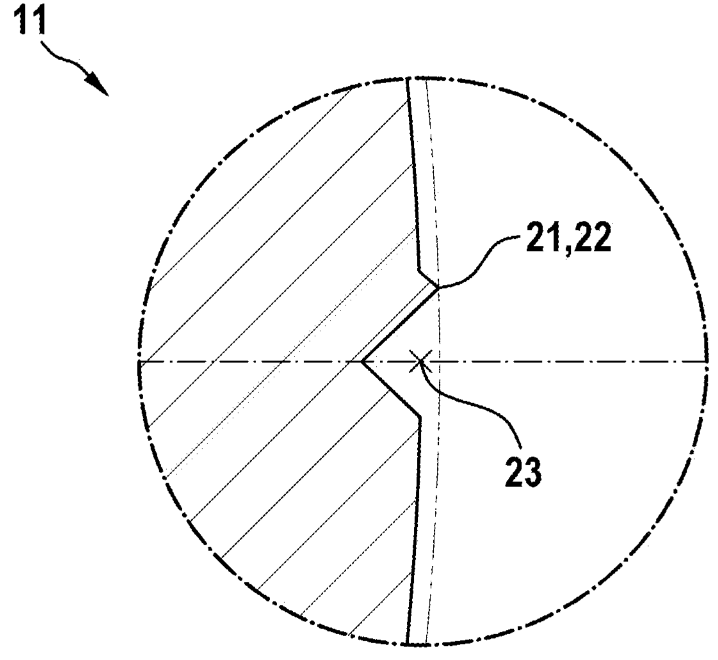
FIG. 11 shows an enlarged view of the area labeled XI in FIG. 10.

As shown in FIGS. 10 to 12, the respective pin 12 may have in the associated contact section 14 at least one projection 21 projecting radially outward with respect to the associated guide axial direction CG. FIG. 10 shows a radial section through the pin 11 and FIG. 11 shows an enlarged view of FIG. 10 in the region of such a projection 21, and FIG. 12 shows a spatial view of the pin 12. As can be seen from FIG. 12, the respective projection 21 extends axially, in the shown exemplary embodiment over the entire extension of the contact section 14. As can be seen in particular from FIG. 11, the projection 21 in the shown exemplary embodiment and preferably is formed as a radially projecting tip 22. The respective projection 21, in particular the respective tip 22, in the shown exemplary embodiment is introduced in a spanning manner, in particular by means of scoring, into the pin 11, so that a depression 23 is formed adjacent to the projection 21, in particular the tip 22. As can be seen from a synopsis of FIGS. 10 and 12, the pin 11 in the exemplary embodiment shown has four such projections 21, which are arranged equidistantly to one another in the associated guide circumferential direction CG, that is two of the projections 21 are arranged radially opposite one another in each case.

Figure 15:
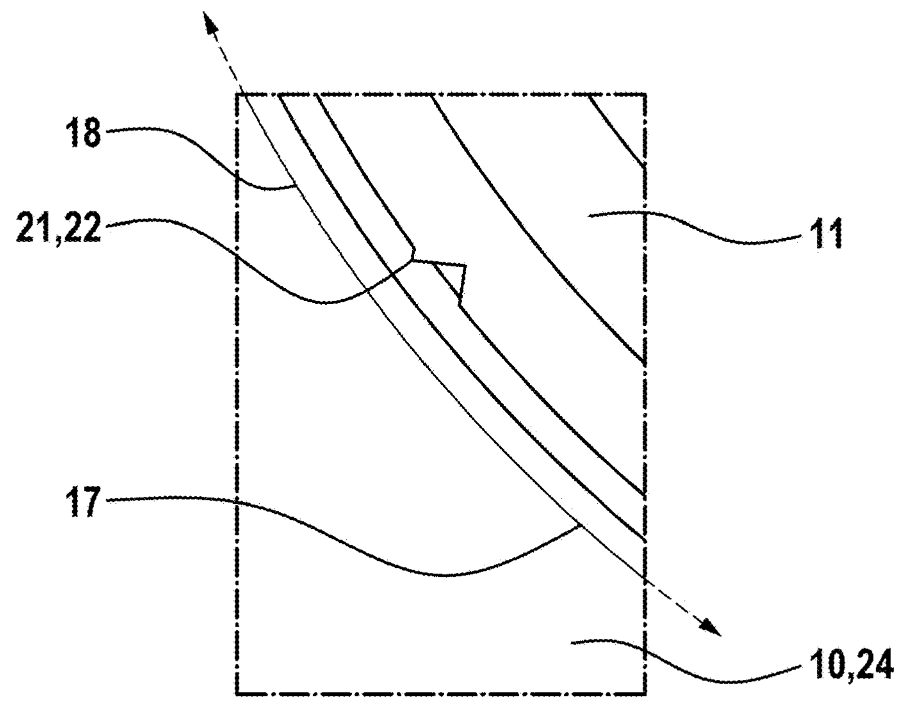
FIG. 15 shows an enlarged view of the area labeled XV in FIG. 14 but in another exemplary embodiment.

The pin 11 shown in the exemplary embodiment of FIGS. 10 to 12 is used exemplarily in the exemplary embodiments shown in FIGS. 3 to 15. Here, the respective projection 21 is in contact with at least two laminations 10 of the associated guide 12. In the exemplary embodiments shown, in the respective lamination opening 13 one of the projections 21 of the associated pin 11 is in contact with the tooth 15 of the lamination opening 13, whereas the remaining projections 21 are spaced apart from the tooth 15 of the lamination opening 13. In the tooth segment 16, there is thus a locally limited interruption of the contact between the tooth 15 and the pin 11 in the region of the recess 23. In the exemplary embodiment of FIG. 14, the projections 21 spaced from the tooth 15 are entirely spaced from the lamination opening 13 and thus from the lamination 10 and are consequently free of contact to the lamination 10. This means that in this exemplary embodiment the gap segment 17 corresponds to the clearance segment 18. FIG. 15 shows an enlarged view in the region labeled XV in FIG. 14 of such a projection 21, but in a different exemplary embodiment. In the exemplary embodiment of FIG. 15, the projections 21 distanced to the tooth 15 are also in contact with the lamination opening 13. The projections 21 spaced from the tooth 15 thus divide the gap segment 15 into clearance segments 18.

In the exemplary embodiment shown in FIG. 22, the pin 11 is smooth in the contact section 14, that is in particular free of projections 21 and recesses 23 of the type described above. In this exemplary embodiment, the respective gap segment 17 thus corresponds to a clearance segment 18 (see FIG. 23). The pin 11 shown in the exemplary embodiment of FIG. 22 is used exemplarily in the exemplary embodiments shown in FIGS. 16 to 23.

The invention claimed is:

1. An electric machine, comprising:
- a rotor rotatable about a motor axial direction;
- a stator including a laminated core with axially successive laminations;
- a carrier to which the stator is fixed;
- at least two pins disposed spaced apart in a motor circumferential direction, the at least two pins fixed to the carrier and extending axially;
- the laminated core including, for a respective pin of the at least two pins, an associated guide through which the respective pin passes;
- wherein the associated guide extends in an associated guide axial direction and has an associated lamination opening in at least a part of the laminations such that the respective pin passes through the associated lamination openings of the associated guide;
- wherein the respective pin is in contact with at least some of the laminations of the laminated core in an axial contact section;
- wherein, in the contact section, at least some of the lamination openings each have at least one tooth projecting radially inwardly with respect to the associated guide axial direction;
- wherein a respective tooth extends in a guide circumferential direction of the associated guide over a tooth segment such that a gap segment adjoining in the guide circumferential direction in the associated lamination opening is free of teeth; and
- wherein the respective tooth contacts an associated pin of the at least two pins and a clearance segment following the respective tooth in the associated lamination opening in the guide circumferential direction of the associated guide is free of contact with the associated pin.

2. The electrical machine according to claim 1, wherein axially successive teeth and gap segments are arranged offset from one another in the guide circumferential direction of the associated guide such that the teeth of the laminations of at least one of the guides, in an axial plan view of the at least one guide, form a shoulder of the at least one guide which is closed in the guide circumferential direction and projects radially inwards.

3. The electrical machine according to claim 1, wherein the respective tooth is deformed when the associated pin is guided through the associated lamination opening.

4. The electrical machine according to claim 3, wherein the laminated core is pressed axially onto the at least two pins such that the teeth are bent and a press fit is provided between the at least two pins and the laminated core.

5. The electrical machine according to claim 4, wherein the stator is positioned and fastened to the carrier via the press fit.

6. The electric machine according to claim 1, wherein:
- at least one pin of the at least two pins includes, in the associated contact section, at least one projection which projects radially outwards with respect to the associated guide axial direction and extends axially; and
- the at least one projection, in the associated contact section, is in contact with at least two laminations of the associated guide.

7. The electrical machine according to claim 6, wherein the at least one projection of at least one pin of the at least two pins includes at least two projections disposed spaced apart from each other in the associated guiding circumferential direction.

8. The electric machine according to claim 7, wherein, in at least one lamination opening, at least one projection of the at least two projections is in contact with a tooth and at least one projection of the at least two projections is in contact with the at least one tooth in the associated guide circumferential direction spaced apart from the lamination opening.

9. The electrical machine according to claim 1, wherein the contact section of at least one pin of the at least two pins is smoothly formed such that in the contact portion the teeth are in contact with the at least one pin.

10. The electric machine according to claim 1, wherein the respective lamination opening has a single tooth.

11. The electric machine according to claim 9, characterized in, wherein:
- the at least two pins includes a number of N pins disposed equidistantly spaced from each other in the motor circumferential direction;
- the respective tooth segment is 360°/N;
- the teeth of the lamination openings of successive lamination openings of the respective lamination in the motor circumferential direction are offset from each other with an opening offset with respect to the associated guide circumferential direction;
- the opening offset is 360°/N; and
  - the teeth of axially successive lamination openings of the respective guide are offset with respect to the associated guide circumferential direction with a lamination offset of 360°/N with respect to each other.

12. The electrical machine according to claim 1, wherein the respective lamination opening has at least M teeth, between each of which a gap segment is arranged, and wherein M is at least two.

13. The electric machine according to claim 12, wherein:
- the at least two pins includes a number of N pins disposed equidistantly spaced from each other in the motor circumferential direction;
- the teeth of the respective lamination opening are spaced apart from one another in the associated guide circumferential direction with a tooth offset of 360°/M;

the teeth of the lamination openings of successive lamination openings of the respective lamination in the motor circumferential direction are offset from each other with an opening offset with respect to the associated guide circumferential direction;

the opening offset is 360°/2M; and the teeth of axially successive lamination openings of the respective guide are offset from each other with a lamination offset of 360°/N.

14. The electric machine according to claim 13, wherein the respective lamination opening has six teeth.

15. The electric machine according to claim 1, wherein the lamination of the laminated core having teeth are formed as identical parts, and axially successive laminations are arranged rotated relative to one another about the motor axial direction.

16. The electric machine according to claim 1, wherein the at least two pins includes three pins.

17. The electrical machine according to claim 1, wherein the respective lamination opening includes six teeth.

18. The electrical machine according to claim 3, wherein the respective tooth is bent when the associated pin is guided through the associated lamination opening.

19. The electrical machine according to claim 14, wherein:

the respective tooth is bent when the associated pin is guided through the associated lamination opening providing a press fit between the at least two pins and the laminated core; and the stator is attached to the carrier via the press fit.

20. The electric machine according to claim 19, wherein:

at least one pin of the at least two pins includes, in the associated contact section, at least one projection projecting radially outwards with respect to the associated guide axial direction and extending axially; and the at least one projection, in the associated contact section, is in contact with at least two laminations of the associated guide.

* * * * *